US011376960B2

(12) United States Patent
Hao et al.

(10) Patent No.: US 11,376,960 B2
(45) Date of Patent: Jul. 5, 2022

(54) OBJECT DETECTION SENSOR ALIGNMENT

(71) Applicant: Aptiv Technologies Limited, St. Michael (BB)

(72) Inventors: Chenghui Hao, Kokomo, IN (US); Ronald M. Taylor, Greentown, IN (US); Roman J. Dietz, Berlin (DE)

(73) Assignee: Aptiv Technologies Limited, St. Michael (BB)

( * ) Notice: Subject to any disclaimer, the term of this patent is extended or adjusted under 35 U.S.C. 154(b) by 274 days.

(21) Appl. No.: 16/140,823

(22) Filed: Sep. 25, 2018

(65) Prior Publication Data

US 2020/0094677 A1 Mar. 26, 2020

(51) Int. Cl.
| | |
|---|---|
| *G01S 17/86* | (2020.01) |
| *B60K 31/00* | (2006.01) |
| *G01B 1/00* | (2006.01) |
| *G01S 7/40* | (2006.01) |
| *G01B 11/00* | (2006.01) |
| *G01S 7/497* | (2006.01) |
| *G01S 13/931* | (2020.01) |

(52) U.S. Cl.
CPC ........ *B60K 31/0008* (2013.01); *G01B 11/002* (2013.01); *G01S 7/40* (2013.01); *G01S 7/4972* (2013.01); *G01S 13/931* (2013.01); *G01S 17/86* (2020.01)

(58) Field of Classification Search
CPC ...................................................... G01S 17/86
USPC ........................................................... 342/70
See application file for complete search history.

(56) References Cited

U.S. PATENT DOCUMENTS

| | | | |
|---|---|---|---|
| 2003/0079355 A1 | 5/2003 | Ferron | |
| 2005/0278098 A1* | 12/2005 | Breed | G01S 7/0235 |
| | | | 701/45 |

(Continued)

FOREIGN PATENT DOCUMENTS

| | | | | |
|---|---|---|---|---|
| DE | 102011120535 A1 * | 6/2013 | .......... | G01S 7/4972 |
| DE | 102011120535 A1 | 6/2013 | | |

(Continued)

OTHER PUBLICATIONS

English Abstract Translation of 102011120535A1, published Jun. 13, 2013.

(Continued)

*Primary Examiner* — Erin F Heard
*Assistant Examiner* — Helena H Seraydaryan
(74) *Attorney, Agent, or Firm* — Sawtooth Patent Group PLLC

(57) ABSTRACT

An illustrative example object detection system includes a sensor having a field of view. The sensor is configured to emit radiation and to detect at least some of the radiation reflected by an object within the field of view. A panel in the field of view allows the radiation to pass through the panel. The panel being is configured to be set in a fixed position relative to a vehicle coordinate system. A plurality of reflective alignment markers are situated on the panel in the field of view. The reflective alignment markers reflect radiation emitted by the sensor back toward the sensor. A processor is configured to determine an alignment of the sensor with the vehicle coordinate system based on an indication from the sensor regarding radiation reflected by the reflective alignment markers and detected by the sensor.

20 Claims, 3 Drawing Sheets

(56) References Cited

U.S. PATENT DOCUMENTS

| | | | |
|---|---|---|---|
| 2009/0033926 A1* | 2/2009 | Haug | G06T 7/80 |
| | | | 356/243.1 |
| 2010/0011041 A1* | 1/2010 | Vannucci | G06F 17/12 |
| | | | 708/400 |
| 2017/0003141 A1* | 1/2017 | Voeller | G01S 17/931 |
| 2017/0212215 A1 | 7/2017 | Hellinger et al. | |
| 2017/0336496 A1 | 11/2017 | Fujii et al. | |
| 2018/0108150 A1* | 4/2018 | Curtis | H04N 13/246 |

FOREIGN PATENT DOCUMENTS

| | | | |
|---|---|---|---|
| EP | 3180636 A1 | 6/2017 | |
| WO | 2011/150946 A1 | 12/2011 | |
| WO | WO-2016025683 A1 * | 2/2016 | G01S 7/4052 |

OTHER PUBLICATIONS

European Search Report for Application No. 19193777, European Patent Office, dated Feb. 18, 2020.

"Foreign Office Action", EP Application No. 19193777.0, dated Dec. 23, 2021, 6 pages.

* cited by examiner

OBJECT DETECTION SENSOR ALIGNMENT

BACKGROUND

Advances in electronics and technology have made it possible to incorporate a variety of advanced features on automotive vehicles. Various sensing technologies have been developed for detecting objects in a vicinity or pathway of a vehicle. Such systems are useful for parking assist and cruise control adjustment features, for example.

More recently, automated vehicle features have become possible to allow for autonomous or semi-autonomous vehicle control. For example, cruise control systems may incorporate light detection and ranging (LiDAR) for detecting an object or another vehicle in the pathway of a vehicle. Depending on the approach speed, the cruise control setting may be automatically adjusted to reduce the speed of the vehicle based on detecting another vehicle in the pathway of the vehicle.

While sensors such as LiDAR are useful there are challenges associated with their use. For example, it is necessary to ensure proper calibration and positioning of the sensor over time.

SUMMARY

An illustrative example object detection system includes a sensor having a field of view. The sensor is configured to emit radiation and to detect at least some of the radiation reflected by an object within the field of view. A panel in the field of view allows the radiation to pass through the panel. The panel is configured to be set in a fixed position relative to a vehicle coordinate system. A plurality of reflective alignment markers are situated on the panel in the field of view. The reflective alignment markers reflect radiation emitted by the sensor back toward the sensor. A processor is configured to determine an alignment of the sensor with the vehicle coordinate system based on an indication from the sensor regarding radiation reflected by the reflective alignment markers and detected by the sensor.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention provide the ability to monitor the alignment of an object detection sensor with a vehicle coordinate system, which serves as a frame of reference. Reflective alignment markers in the field of view of the sensor allow the sensor to provide an indication of an alignment of the sensor field of view with the vehicle coordinate system.

Figure 1:
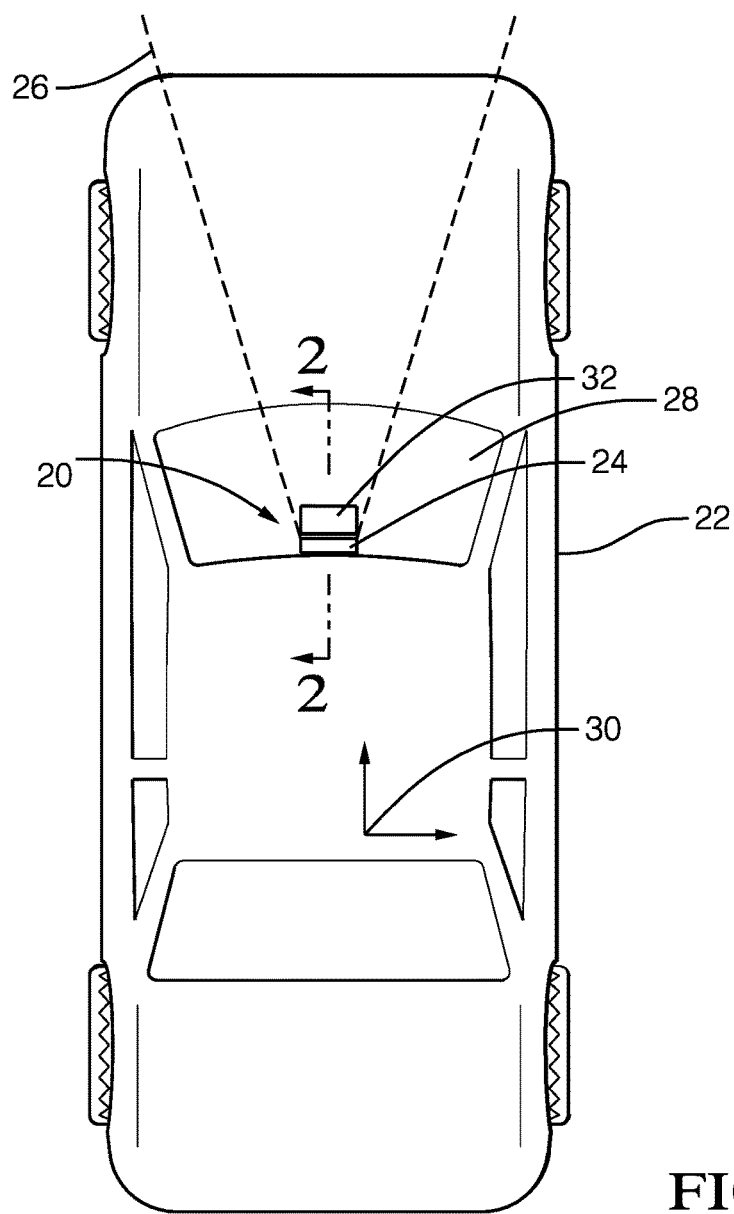
FIG. 1 diagrammatically illustrates a vehicle including an object detection system designed according to an embodiment of this invention.
Figure 2:
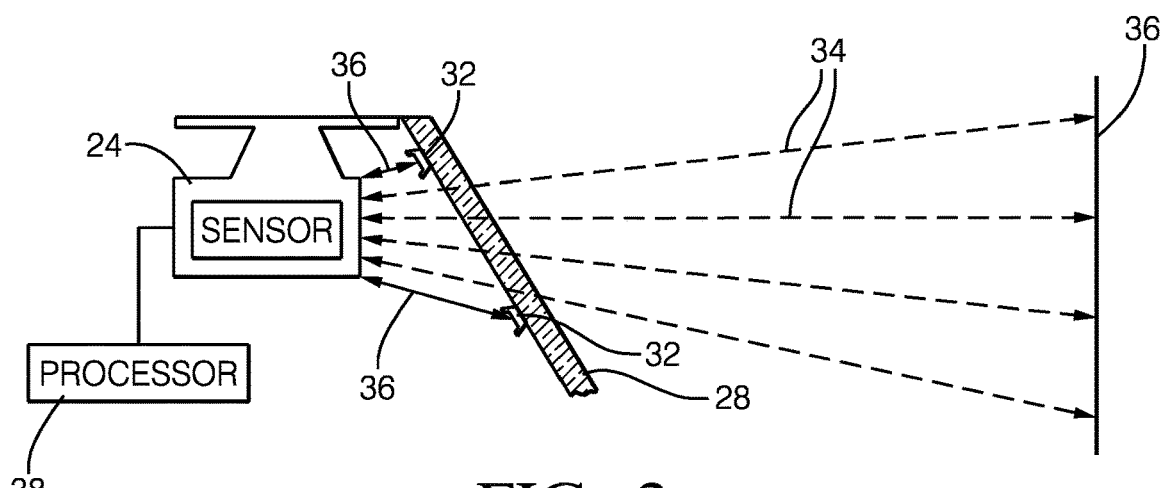
FIG. 2 illustrates selected features of an example embodiment from a perspective along the lines 2-2 in FIG. 1.

FIGS. 1 and 2 schematically illustrate an object detection system 20 associated with a vehicle 22. In some example embodiments, the object detection system 20 is used to provide driver-assist features while, in other embodiments, the object detection system 20 is used for autonomous vehicle operation.

The object detection system 20 includes a sensor 24 that has a field of view 26 for detecting objects in a vicinity or pathway of the vehicle 22. For discussion purposes, a LiDAR sensor 24 is used as an example. The radiation emitted by such a sensor comprises light. Other sensor configurations that include other types of radiation are used in some example embodiments. The sensor 24 is situated near a panel 28, which in the example of FIG. 1 is a windshield of the vehicle 22. The panel 28 remains in a fixed position relative to a vehicle coordinate system 30. The panel 28 is transparent to radiation emitted by the sensor 24 as schematically shown at 34 in FIG. 2. When such radiation reflects off an object 36, the system 20 is capable of providing information regarding such an object including, for example, its position relative to the vehicle 22.

A plurality of reflective alignment markers 32 are situated on the panel 28 in fixed positions that remain constant relative to the panel 28 and the vehicle coordinate system 30. When the sensor 24 is set in a desired position and orientation relative to the panel 28, the reflective alignment markers 32 are within the field of view 26 of the sensor 24. The reflective alignment markers 32 reflect at least some of the radiation emitted by the sensor 24 as schematically shown at 36. Such reflected radiation is detected by the sensor 24 and provides an indication of the orientation of the sensor 24 and its field of view 26 with respect to the vehicle coordinate system 30. A processor 38 is configured to determine an alignment of the sensor 24 with the vehicle coordinate system 30 based on an indication from the sensor 24 regarding the radiation 36 reflected by the reflective alignment markers 32 as such radiation 36 is detected by the sensor 24.

The panel 28 comprises a first material that is essentially transparent to the radiation emitted by the sensor 24. The reflective alignment markers in some embodiments comprise a second, different material applied to the panel 28 or otherwise incorporated into the panel 28. The second, different material is not transparent to the radiation emitted by the sensor 24, but, instead, reflects that radiation back toward to the sensor 24. The reflective alignment markers 32, in some example embodiments, are situated on the panel 28 by applying a reflective film to at least one surface of the panel 28.

In another example embodiment, the reflective alignment markers are established by a surface treatment on corresponding portions of the panel 28, such as etching or through micro-optical surface shaping to create a reflective grating or pattern on the panel 28. The gratings or patterns are shaped to enhance focusing the reflected radiation toward the sensor 24 due to the relatively short distance between the panel 28 and the sensor 24.

Since the reflective alignment markers 32 remain in a fixed position on the panel 28 and the panel 28 remains in a fixed position with respect to the vehicle coordinate system 30, the reflective alignment markers 32 provide a reference to allow the processor 38 to determine whether the sensor 24 is properly aligned with the vehicle coordinate system 30. For example, over time a sensor position may change as a result of vibration or impact. The processor 38 is capable of determining when such misalignment has occurred and provides an output indicating a need for sensor pose compensation, sensor service or including an alert or alarm regarding the sensor misalignment condition. In example embodiments, sensor pose compensation is accomplished through software, using an actuator or both.

Figure 3:
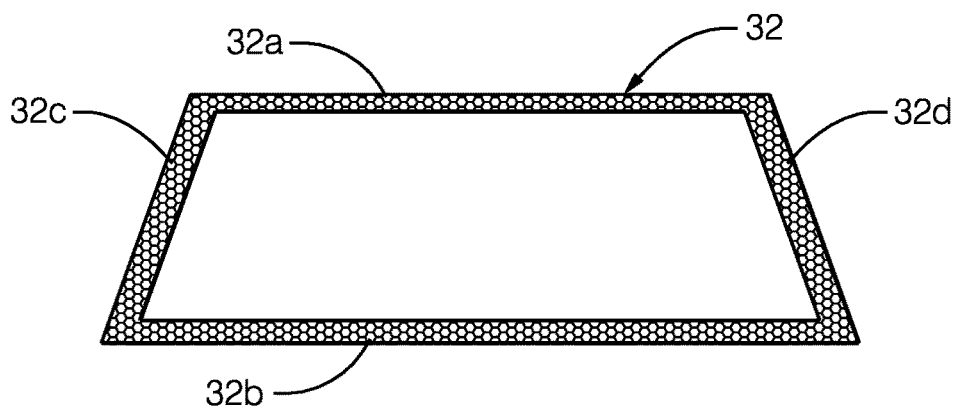
FIG. 3 schematically illustrates an example arrangement of reflective alignment markers according to an embodiment of this invention.

FIG. 3 schematically illustrates an example arrangement of reflective alignment markers 32. In this example, given the orientation of the windshield panel 28 relative to the sensor 24 and the shape of the windshield panel 28, the alignment markers 32 are in a generally trapezoidal configuration. A first one of the alignment markers 32A is situated as a horizontal line segment and is parallel to a second alignment marker 32B. A third alignment marker 32C is situated generally vertical and at an oblique angle relative to the alignment markers 32A and 32B. A fourth alignment marker 32D is generally vertical and situated at an oblique angle relative to the alignment markers 32A and 32B.

Figure 4:
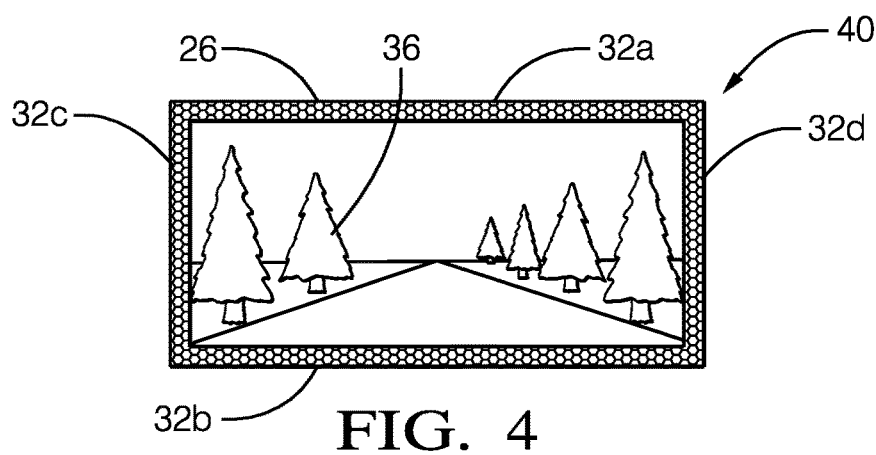
FIG. 4 schematically illustrates an example sensor output including an indication of an orientation of alignment markers with a field of view of the sensor according to an embodiment of this invention.

Although the actual, physical orientation of the alignment markers 32 shown in FIG. 3 is not truly rectangular, the field of vision 26 of the sensor 24 is and the relative positions between the sensor 24 and the windshield panel 28 result in the sensor 24 detecting the reflective alignment markers 32 in a way that results in a rectangular output schematically shown at 40 in FIG. 4 from the sensor 24. The field of view 26, in this example, is effectively framed by the reflective alignment markers 32A-32D with any objects 36 within the field of view 26 situated within that frame. The reflective alignment markers, in this example, border the periphery of the field of view 26 when the sensor 24 is properly aligned with the vehicle coordinate system 30.

The sensor 24 provides an indication of the positions of the reflective alignment markers 32 within the field of view 26 in a manner that is recognizable by the processor 38 for making a determination regarding the alignment of the sensor 24 with the vehicle coordinate system 30. In some embodiments, the indication regarding the radiation reflected at 36 from the reflective alignment markers 32 is a first, predetermined indication, such as bordering the field of view 26, when the sensor 24 is properly aligned with the vehicle coordinate system 30. A second, different indication from the sensor 24 is the result of any misalignment between the sensor 24 and the vehicle coordinate system 30. The processor 38, in such embodiments, is programmed or configured to compare the indication from the sensor 24 regarding the radiation 36 reflected by the reflective alignment markers 32 to the first indication and to recognize any difference from that as an indication that there is some misalignment.

Figure 5:
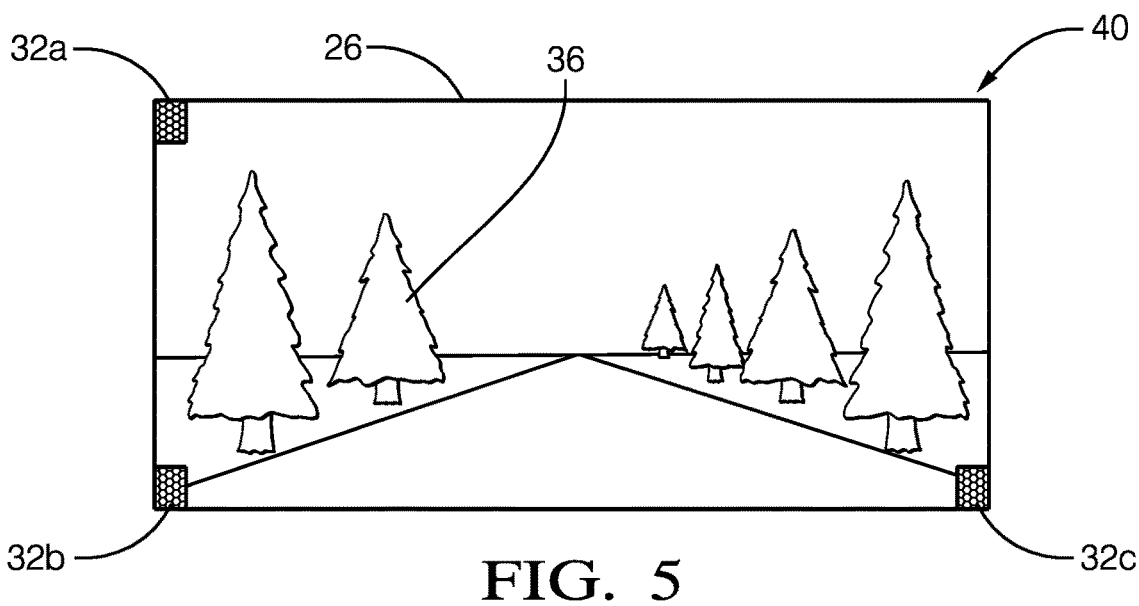
FIG. 5 schematically illustrates another example sensor output including an indication of an orientation of alignment markers with a field of view of the sensor according to an embodiment of this invention.

While the example of FIGS. 3 and 4 includes linear segment reflective alignment markers, other embodiments include different configurations. FIG. 5 illustrates an example sensor output when the alignment markers 30 include relatively small rectangular segments situated near corners of the field of view 26. In this example, the field of view 26 is generally rectangular. In the example of FIG. 5, only three reflective alignment markers 32A, 32B, and 32C are provided. Having at least two of those alignment markers aligned with each other along a generally horizontal line and two of the reflective alignment markers situated relative to each other in alignment along a generally vertical line allows for the processor 38 to make a determination regarding the alignment of the sensor 24 in two dimensions.

Given this description, those skilled in the art will realize that a variety of arrangements of reflective alignment markers 32 are possible and they will be able to select an appropriate arrangement and configuration of such alignment markers to meet their particular needs. The contour and position of the panel 28 relative to the sensor 24 and its field of view may dictate particular requirements for positioning the reflective alignment markers 32 to provide desired results for a particular sensor arrangement.

Figure 6:
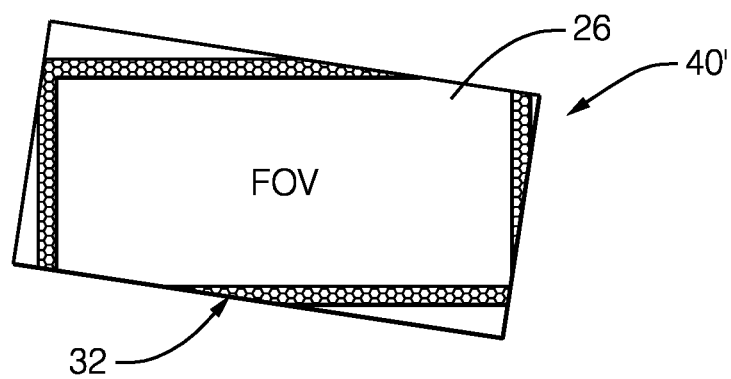
FIG. 6 schematically illustrates an example sensor misalignment condition.

With the reflective alignment markers 32, the processor 38 is able to use information from the sensor 24 for detecting a variety of potential misalignment conditions. FIG. 6 schematically shows a situation in which the field of view 26 is tilted relative to the frame established by the alignment markers 32. Under such conditions, instead of the alignments markers 32 establishing a frame around the border of the field of view 26, only portions of the alignment markers appear in the image information from the sensor 24 and those portions are not properly aligned with the borders of the field of view 26. As schematically shown in FIG. 6, portions of the reflective alignment markers 32 are outside the field of view 26 and do not appear in the sensor output 40' shown in FIG. 6.

Figure 7:
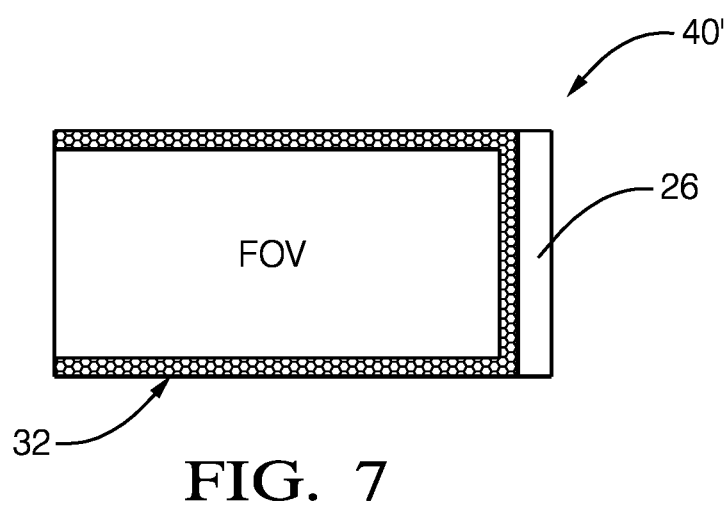
FIG. 7 schematically illustrates another example sensor misalignment condition.

Another example condition in which the sensor 24 is misaligned with the vehicle coordinate system 30 is schematically represented in FIG. 7. In this example, the sensor 24 has been shifted to the right (according to the illustration) compared to a proper installation position of the sensor 24. Alternatively, the sensor may have been rotated about a vertical axis slightly to the right (again, according to the illustration). In this example, the sensor output 40' does not include all of the reflective alignment markers 32. For example, the reflective alignment marker 32 that should border the left side of the field of view 26 is not within the field of view 26. Additionally, the reflective alignment marker 32 that should border the right side of the field of view 26 appears inward inside the field of view to the left of the right border of the field of view 26.

Figure 8:
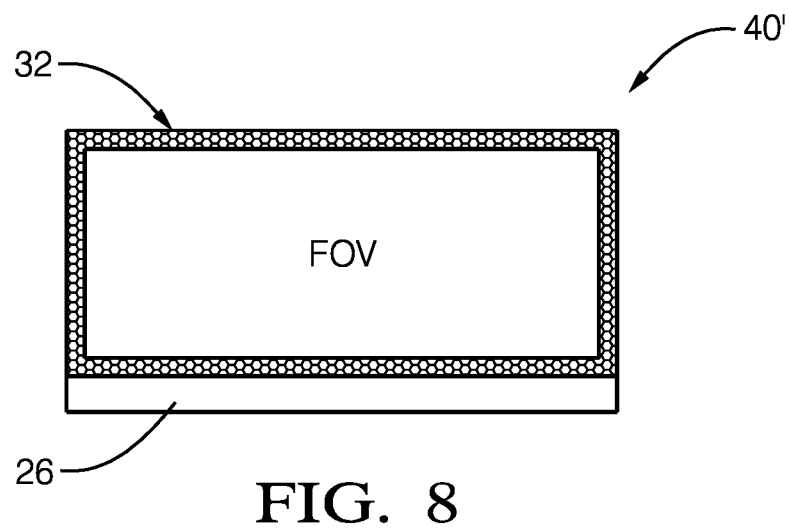
FIG. 8 schematically illustrates another example sensor misalignment condition.

Another misalignment situation that can be determined using an embodiment of this invention is schematically shown in FIG. 8. In this condition, the sensor 24 has been tilted relative to the panel 28 such that the frame or border provided by the radiation reflected by the reflective alignment markers 32 appears shorter than the field of view 26. The indication of the alignment marker that should be bordering the bottom edge of the field of view 26 appears to be shifted upward making the frame height less than the height of the field of view 26.

The processor 38 is programmed to recognize any of the misalignment conditions shown in FIGS. 6, 7, and 8 along with other potential misalignment conditions.

The reflective alignment markers 32, in some example embodiments, include a concave reflecting surface that focuses the radiation 36 reflected by the alignment markers 32 back toward the sensor 24. Providing a focusing surface enhances the ability of the sensor 24 to properly detect the reflected radiation at 36, which might otherwise introduce some challenges because the alignment markers 32 are relatively close to the sensor 24.

The way in which the sensor 24 provides an indication of the position of the alignment markers 32 relative to the field of view 26 may vary depending on the particular embodiment. In some embodiments, the intensity of the reflected radiation is greater when reflected by the reflective alignment markers 32 compared to that reflected by objects 36 at a further distance from the sensor 24. Other examples include using a time of flight or time difference information between emitted radiation pulses and the detected reflected radiation. The much closer position of the alignment markers 32 results in a much shorter time of flight or time difference compared to that associated with objects further from the sensor 24. The processor 38 is programmed or otherwise configured to recognize the indication from the sensor 24 to determine the position of the reflective alignment markers 32 relative to the field of view 26.

With an object detection system designed according to an embodiment of this invention, it becomes possible to monitor the alignment of the sensor 24 relative to the vehicle coordinate system 30 over time. Ensuring proper sensor alignment provides more accurate information regarding objects relative to the vehicle 22, which enhances or improves the ability of the object detections system 20 to provide accurate information for a variety of purposes.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An object detection system, comprising:
   a LiDAR sensor installed on a vehicle having a field of view, the LiDAR sensor being configured to emit radiation and to detect at least some of the radiation reflected by an object within the field of view;
   a panel installed on the vehicle in the field of view, the panel comprising a windshield of the vehicle and being transparent to the radiation emitted by the LiDAR sensor, the panel being in a fixed position relative to a vehicle coordinate system;
   a plurality of reflective alignment markers situated on the panel in the field of view and configured to reflect radiation emitted by the LiDAR sensor back toward the LiDAR sensor; and
   a processor that is configured to determine an alignment of the LiDAR sensor with the vehicle coordinate system based on an indication from the LiDAR sensor regarding radiation reflected by the reflective alignment markers and detected by the LiDAR sensor.

2. The object detection system of claim 1, wherein
   the panel comprises a first material; and
   the reflective alignment markers comprise a second, different material applied to the panel.

3. The object detection system of claim 2, wherein the reflective alignment markers comprise a film applied to the panel.

4. The object detection system of claim 1, wherein the reflective alignment markers comprise a focusing shape that focuses radiation reflected by the reflective alignment markers toward the LiDAR sensor.

5. The object detection system of claim 4, wherein the reflective alignment markers have an at least partially concave focusing surface.

6. The object detection system of claim 1, wherein the reflective alignment markers comprise a surface treatment on corresponding portions of the panel.

7. The object detection system of claim 1, wherein
   the plurality of reflective alignment markers comprise at least three reflective alignment markers; and
   the at least three reflective alignment markers are situated relative to each other to provide alignment information in at least two dimensions.

8. The object detection system of claim 7, wherein
   at least one of the reflective alignment markers is aligned with at least one other of the reflective alignment markers on a generally vertical line; and
   at least one of the reflective alignment markers is aligned with at least one other of the reflective alignment markers on a generally horizontal line.

9. The object detection system of claim 1, wherein
   the field of view is generally rectangular having four corners; and
   at least one of the reflective alignment markers is near each of the four corners.

10. The object detection system of claim 9, wherein the reflective alignment markers establish a rectangular frame along a periphery of the field of view, the rectangular frame comprising:
    a first one of the reflective alignment markers defines a first side of the frame;
    a second one of the reflective alignment markers defines a second side of the frame;
    a third one of the reflective alignment markers defines a third side of the frame; and
    a fourth one of the reflective alignment markers defines a fourth side of the frame.

11. The object detection system of claim 1, wherein the processor is configured to repeatedly determine the alignment of the LiDAR sensor with the vehicle coordinate system and to provide an output when the indication from the LiDAR sensor corresponds to a misalignment between the LiDAR sensor and the vehicle coordinate system.

12. The object detection system of claim 11, wherein the output of the processor comprises at least one of: (i) an indication that sensor pose compensation is needed, (ii) an indication to obtain service for the LiDAR sensor or (iii) an alarm corresponding to the misalignment.

13. The object detection system of claim 1, wherein
    the LiDAR sensor provides a first, predetermined indication based on detecting radiation reflected by the reflective alignment markers when the LiDAR sensor is properly aligned with the vehicle coordinate system;
    the LiDAR sensor provides a second, different indication based on detecting radiation reflected by the reflective alignment markers when the LiDAR sensor is misaligned with the vehicle coordinate system; and
    the processor determines whether the indication from the LiDAR sensor corresponds to the first indication or the second indication.

14. The object detection system of claim 12, wherein processor is further configured to, in response to determining the output of the processor includes the indication that sensor pose compensation is needed, perform sensor pose compensation to adjust the alignment between the LiDAR sensor and the vehicle coordinate system by at least one of executing software or controlling an actuator that improves the alignment between the LiDAR sensor and the vehicle coordinate system.

15. A method comprising:
  emitting radiation, from a LiDAR sensor installed on a vehicle having a field of view,
    the LiDAR sensor being configured to emit radiation and to detect at least some of the radiation reflected by an object within the field of view;
  reflecting radiation emitted by the LiDAR sensor back toward the LiDAR sensor, with a plurality of reflective alignment markers situated on a panel in the field of view,
    the panel installed on the vehicle in a fixed position relative to a vehicle coordinate system, the panel comprising a windshield of the vehicle and being transparent to the radiation emitted by the LiDAR sensor; and
  determining, with a processor, an alignment of the LiDAR sensor with the vehicle coordinate system based on an indication from the LiDAR sensor regarding radiation reflected by the plurality of reflective alignment markers and detected by the LiDAR sensor.

16. The method of claim 15, wherein determining the alignment of the LiDAR sensor comprises repeatedly determining the alignment of the LiDAR sensor with the vehicle coordinate system and the method comprises providing an output when the indication from the LiDAR sensor corresponds to a misalignment between the LiDAR sensor and the vehicle coordinate system.

17. The method of claim 16, wherein the output comprises at least one of: (i) an indication that sensor pose compensation is needed, (ii) an indication to obtain service for the LiDAR sensor or (iii) an alarm corresponding to the misalignment.

18. The method of claim 15, wherein the indication from the LiDAR sensor comprises a first, predetermined indication when the LiDAR sensor is properly aligned with the vehicle coordinate system and a second, different indication when the LiDAR sensor is misaligned with the vehicle coordinate system; and
  determining the alignment of the LiDAR sensor comprises determining whether the indication from the LiDAR sensor corresponds to the first indication or the second indication.

19. The method of claim 15, comprising focusing the radiation reflected by the reflective alignment markers onto a portion of the LiDAR sensor.

20. The method of claim 17, further comprising in response to determining the output of the processor includes the indication that sensor pose compensation is needed, performing, by a processor, sensor pose compensation by at least one of executing software or controlling an actuator that improves the alignment between the LiDAR sensor and the vehicle coordinate system.

* * * * *